United States Patent
Baecker et al.

(10) Patent No.: US 7,257,804 B2
(45) Date of Patent: Aug. 14, 2007

(54) METHOD OF PRODUCING A SOFTWARE PRODUCT

(75) Inventors: Thomas Peter Baecker, Buettelborn (DE); Kevin Carnahan, Bad Homburg (DE); Susanne Kloess, München (DE); Beat R. Monnerat, Herrliberg (CH); Tanya Nargolwalla, Liederbach (DE); Richard L. Robbins, Jr., Königstein (DE); Robert R. Zahm, Rye, NY (US)

(73) Assignee: Accenture Global Services GmbH, Schaffhausen (CH)

( * ) Notice: Subject to any disclaimer, the term of this patent is extended or adjusted under 35 U.S.C. 154(b) by 388 days.

(21) Appl. No.: 10/311,648

(22) PCT Filed: Jun. 13, 2002

(86) PCT No.: PCT/EP02/06521

§ 371 (c)(1),
(2), (4) Date: Dec. 16, 2002

(87) PCT Pub. No.: WO02/101541

PCT Pub. Date: Dec. 19, 2002

(65) Prior Publication Data

US 2004/0031014 A1    Feb. 12, 2004

(30) Foreign Application Priority Data

Jun. 13, 2001    (EP) .................................. 01114392

(51) Int. Cl.
*G06F 9/44*    (2006.01)
(52) U.S. Cl. .................... 717/124; 717/125; 717/126; 717/127; 717/130; 717/131
(58) Field of Classification Search ........ 717/124–127, 717/130–131, 104
See application file for complete search history.

(56) References Cited

U.S. PATENT DOCUMENTS 5,673,387 A * 9/1997 Chen et al. .................... 714/38
6,179,491 B1 * 1/2001 Choi et al. .................. 717/116

(Continued)

FOREIGN PATENT DOCUMENTS

EP    0 549 112 A2    6/1993
EP    0 714 064 A1    5/1996

OTHER PUBLICATIONS

D. Binkley, "Using Semantic Differencing to Reduce the Cost of Regression Testing", 1992, IEEE, p. 41-50.*
Gupta, et al., "An Approach to Regression Testing using Slicing", 1992, IEEE, p. 299-308.*

(Continued)

*Primary Examiner*—Wei Zhen
*Assistant Examiner*—Qamrun Nahar
(74) *Attorney, Agent, or Firm*—Fish & Richardson P.C.

(57) ABSTRACT

A software product is produced by defining a functional model of the overall software product, designing, based on this functional model, a plurality n of configurations and slices of the software product, wherein a configuration is the entirety or a part of the software product forming an independently testable unit and a slice is a set of functions of the software product constructed together and forming the entirety or part of a configuration. The n slices are independently constructed wherein the first slice forms the first configuration. The second to n-th configurations are formed by integrating the k-th configuration with the (k−1)-th slice, wherein k is 1, . . . n−1 Subsequently a first to n-th configuration are tested independently. This software development approach allows an integration of the overall systems in parts as early as possible and to gradually increase the number of integrated components in a controlled, but manageable fashion. This allows achievement of a highly efficient use of resources within a short development time.

20 Claims, 10 Drawing Sheets

U.S. PATENT DOCUMENTS 6,748,584 B1 * 6/2004 Witchel et al. ............. 717/124

OTHER PUBLICATIONS

D. Binkley, "Semantics Guided Regression Test Cost Reduction", 1997, IEEE, p. 498-516.*

Bible, et al., "A Comparative Study of Coarse- and Fine-Grained Safe Regression Test-Selection Techniques", 2001, ACM, p. 149-183.*

Liang, et al., "Equivalence Analysis and Its Application in Improving the Efficiency of Program Slicing", 2002, ACM, p. 347-383.*

Mark Weiser, "Program Slicing", IEEE Transactions on Software Engineering, vol. SE 10, No. 4, Jul. 1984, pp. 352-357.

Cockburn, A.A.R., "The impact of object-orientation on application development", IBM Systems Journal, 32 (1993) No. 3, Armonk, New York.

* cited by examiner

METHOD OF PRODUCING A SOFTWARE PRODUCT

This application claims the priority benefit of European Patent Application Serial No. 01114392.2, filed Jun. 13, 2001, titled "METHOD OF PRODUCING A SOFTWARE PRODUCT."

The present invention relates to a method of producing a software product and the resulting software product produced by this method.

RELATED ART

The development of a software product, in particular customer specific software, generally consists of four main stages, namely the analysis, design, construction and test stages. A software product may be any type of software system which may consist of a plurality of subsystems, programs or routines.

In the analysis stage, the scope of business requirements to be addressed is defined. Also, an initial definition of the required software components and the high level implementation approach are created. In the design phase the specifications of the software product are defined in accordance with the desired functions. These specifications are then implemented as software code in the subsequent construction phase. The software is then subject to a test routine in which it is checked whether or not the designed specifications are met. With complex software products this last step is in many cases the most time consuming.

One traditional way of software development is the so-called waterfall approach, which is illustrated in FIG. 1. The four stages—analysis, design, implementation (construction) and testing—are carried out consecutively for the whole software product. This approach works well for smaller systems. With increasing complexity of the software product, however, the time required for the total development process, in particular the testing phase, increases substantially.

Another approach is the iterative development of a software product which is illustrated in FIG. 3.

The four implementation steps analysis, design, construction and testing are carried out consecutively as in the case of the waterfall model. Then a new functionality is added and the design, implementation and test steps are carried out recursively for the program including the new functionality. If all desired functionality has been added and has been successfully tested as part of the whole system the whole development process is completed. This approach is particularly useful if existing systems have to be adapted, upgraded or amended. Every new functionality, however, has interfaces with various parts of the existing system and therefore requires extensive testing of the system with the additional functions.

A further alternative approach for software development is the modular approach. The corresponding development process is illustrated in FIG. 2. After the analysis step, the functionality of the whole software system is cut down into separate functional modules. These are then independently designed, constructed and tested by respective working teams. The functionality of every module is independently verified by a corresponding test. In the subsequent integration steps all the modules are integrated from the complete system which then has to undergo an integration and recursion test to check whether the modules work together correctly and the interfaces are consistent with each other. Due to the late integration within the development process the final integration and recursion test may reveal a considerable number of errors. As a result of the extended testing activities for verifying the proper integration of the overall system the modular approach typically is time- and cost-intensive in particular during the later stages of the project.

Complexity of software development increases with the number of functions to be implemented. As the number of functions increase, the corresponding increase of complexity grows as a multiple of the increase in number of functions. This increase of complexity is mainly due to the substantial increase in integration issues in construction and increasing number of functional permutations subject to testing. Traditional development approaches following the waterfall model do not effectively address the issues of overall integration and testing complexity.

There is therefore a need for reducing the total implementation time for complex software products, in particular customer specific software products.

SUMMARY OF THE INVENTION

The present invention provides a method of producing a target software product, comprising defining a functional model of the software product, designing, based on the functional model, a plurality n of configurations and slices of the software product, a configuration being the entirety or a part of the software product forming an independently testable unit and a slice being a set of functions of the software product constructed together and forming the entirety or a part of a configuration, constructing a first slice, forming a first configuration, independently constructing second to n-th slices of the software product, forming the (k+1)-th configuration by integrating the k-th configuration with the (k+1)-th slice, wherein k=1, . . . n−1, and independently testing the first to n-th configuration.

According to the present invention, as a first step, a functional model of the entire software product to be developed is created. Based on this functional model the software product is divided into a plurality of functional units or slices, wherein a first slice comprises basic functionality and every further slice adds new functionality. The first slice forms the first independently testable configuration. The first and second slice form the second configuration, which is, like all further configurations, independently testable. With every new slice being added and integrated a new configuration is created. The slices are then constructed independently of each other. Subsequently, the resulting configurations of the software product are tested independently of each other. Preferably, an overall regression test is then performed covering the complete software product.

Defining a functional model of the entire software product preferably includes defining the overall architecture of the same and the definition of external interfaces of the whole system.

Constructing the respective slices can be carried out at least partially in parallel resulting in a reduced development time of the overall system.

In addition, the testing of a configuration may be started as soon as the configuration is finished and in parallel to constructing the other slices which have not yet been finished. Further time savings can therefore be attained.

The regression test of the completed entire system may comprise test routines for sets of functionalities which sets are different from the slices.

An intergration layer or integration seam preferably comprises a limited set of components delivered with configuration k as part of slice k, which is then adapted again with slice k+1. The integration seam may also comprise components which are "stubbed" with configuration k as part of slice k and which are replaced with real functionality-bearing components as part of slice k+1.

In order to secure a proper functioning of every development configuration, it is preferred to carry out at least three test executions for every configuration, i.e. one initial test and two regression tests each including fixing bugs found throughout a test execution. Dependent on the specific software system, however, any other number of test runs may be carried out. At the end of the development process, a final overall regression test is done.

According to a particular embodiment, each slice has defined entry points to trigger a desired functionality and defined outputs for verification of this functionality by the corresponding test routine.

The present invention allows an efficient and time saving development of complex software products. The sliced development approach ensures that core functionality may be tested in an early stage of the development, thus avoiding later reengineering work. Repeated execution of the test routines of the first slices ensures that the functionality of these slices is not lost during the subsequent development activities. Therefore, development time savings particularly for the test stage can be realized.

Preferably the subsequent slices are built on each other, generally starting with infrastructure and/or architecture functions, followed by set up functions, capture/entry functions, transaction processing, then followed by primary outputs (responses, confirmations etc., i.e. information based on transacting itself), and followed by secondary outputs (reports, files, i.e. information based on evaluating stored transactions).

It is also possible to define a first slice consisting of basic functionality which can be completed within a short time frame. This allows early assessment of whether or not the general design of the software product works. Major changes of the software at late development stages can thus be avoided. Having an early response to a design approach also enhances business flexibility with respect to incorporation of amendments requested by the user or customer of the software product. A basic early slice can also be used to train a development team on the product and the development processes.

To reduce integration problems, the slices are preferably defined such as to minimize internal interfaces between different slices. According to a particular embodiment, a slice has interfaces to not more than two adjacent slices.

The present invention may comprise creating, for every test routine, a test database for storing test data. A test routine may comprise functional test cycles and technical test cycles.

The present invention further provides a computer program product produced by defining a functional model of the software product, designing, based on the functional model, a plurality n of configurations and slices of the software product, a configuration being the entirety or a part of the software product forming an independently testable unit and a slice being a set of functions of the software product constructed together and forming the entirety or a part of a configuration, constructing a first slice forming the first configuration, independently constructing second to n-th slices of the software product, forming the (k+1)-th configuration by integrating the k-th configuration with the (k+1)-th slice, wherein $k=1, \ldots n-1$, and independently testing the first to n-th configuration.

The present invention further provides a storage medium having stored thereon a computer program product produced by the steps of defining a functional model of the software product, designing, based on the functional model, a plurality n of configurations and slices of the software product, a configuration being the entirety or a part of the software product forming an independently testable unit and a slice being a set of functions of the software product constructed together and forming the entirety or a part of a configuration, constructing a first slice forming the first configuration, independently constructing second to n-th slices of the software product, forming the (k+1)-th configuration by integrating the k-th configuration with the (k+1)-th slice, wherein $k=1, \ldots n-1$ and independently testing the first to n-th configuration.

The present invention still further provides a computer system comprising an input/output unit, a processing unit and a storage unit, the storage unit comprising storage means having stored thereon a computer program product produced by defining a functional model of the software product, designing, based on the functional model, a plurality n of configurations and slices of the software product, a configuration being the entirety or a part of the software product forming an independently testable unit and a slice being a set of functions of the software product constructed together and forming the entirety or a part of a configuration, constructing a first slice forming the first configuration, independently constructing second to n-th slices of the software product, forming the (k+1)-th configuration by integrating the k-th configuration with the (k+1)-th slice, wherein $k=1, \ldots n-1$ and independently testing the first to n-th configuration.

BRIEF DESCRIPTION OF THE DRAWINGS

The present invention and further features, objects and advantages thereof will become more readily apparent from the following description of preferred embodiments of the present invention and by reference to the enclosed drawings, in which.

DETAILED DESCRIPTION OF PREFERRED EMBODIMENTS

Figure 1:
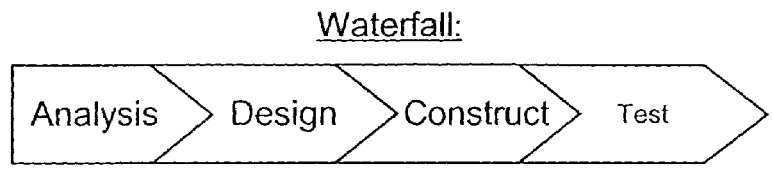
FIG. 1 is a schematic illustration of the method steps for producing a software product according to the prior art waterfall method.

In the following some expressions used in the specification are defined:

Software product: any type of software system, which may include a plurality of subsystems, subprograms or routines.

Computer program: any type of computer executable software including large software systems comprising a plurality of subsystems, subprograms or routines.

Configuration: entirety or part of a software product which has been constructed to be executable as testable unit. A configuration may be formed of one or a plurality of slices.

Slice: a set of functions of the software product constructed together and forming the entirety or a part of a configuration.

Analysis: analyzing the problems and functions to be performed by the computer program and break it down into functional groups.

Design: defining the specifications of a software product or part thereof and providing the general layout thereof.

Construction: programming or implementing a software product or part thereof.

Test: Verification whether or not the desired functions and specifications of a program or functional group thereof are met, including, if necessary, fixing any bugs revealed during the test.

In particular the following advantages can be achieved with the present invention.

(1.) The invention enables faster delivery of software by
allowing the completion of development stages in parallel to each other (work pipelining),
increasing productivity through continuous process improvement by repeatedly applying design and construction techniques to multiple slices (implementation packages) by the development teams,
minimizing the communication efforts and costs associated with the hand-over of implementation packages between different development teams by eliminating many hand-overs, and
supporting the use of larger development teams and therewith reducing the implementation time through a better distribution and delegation of the development work.

(2.) The invention decreases the risk of project failure by
shortening the time frame over which business requirements of the software product can be changed,
increasing a flexibility to respond to new business requirements, e.g. through the introduction of additional slices,
increasing the correctness of the software through earlier completion of the same and testing of complex and/or core functions, and
defining the overall functionality at the start of the project.

(3.) The invention increases the software quality by
increasing the total amount of testing that can be conducted,
increasing the testing effort focused on particularly complex or critical functions, and
the introduction of a test team independent of the development teams responsible for the analysis, design and build stages (four-eye principle).

(4.) The invention decreases the cost of errors by enabling their early detection and correction.

(5.) The invention provides a vehicle for training new software developers and teams
through the repeated application of software development techniques
in a short period of time across multiple functions.

(6.) The invention makes possible the delivery of large, complex projects through the
definition of clear, clean interfaces between system and system component, and
decomposition of the development effort into multiple, controlled slices.

(7.) The invention supports development of both new applications as well as enhancements and/or extensions to existing or legacy applications.

(8.) The invention is applicable across all programming models; e.g., procedural, object oriented, etc. programming models.

Preferred Embodiment

FIGS. 4-7 schematically illustrate consecutive development steps for producing a software product according to a preferred embodiment of the present invention.

At the beginning of the development process, the functionality to be implemented with the software product to be developed is analyzed and the overall functionality of the target system is defined. This includes the software architecture of the system and a clear definition of user interfaces, reports, broadcasting functions and the data types and parameters used. The entirety of the target system is indicated by reference numeral 100 in FIG. 1. This system is divided up into a plurality of functional units or slices, in the shown example into three slices. The number of slices used may by chosen according to the specifications and particulars of the specific software product. Preferably, the first slice comprises basic functionality like system management functions. The following slices then provide higher-level functions based on the content of the first slice. The second slice so may comprise system setup functions including e.g. reference and configuration data entry and maintenance, user entry and maintenance and authorization information. The following slices can then provide various business application functions.

Slices should build on each other, generally starting with infrastructure/architecture functions, followed by set-up functions, followed by capture/entry functions, followed by transaction processing, followed by primary outputs (responses, confirmations, etc., i.e. information based on transacting itself), and followed by secondary outputs (reports, files, i.e. information based on evaluating stored transactions).

Figure 4:
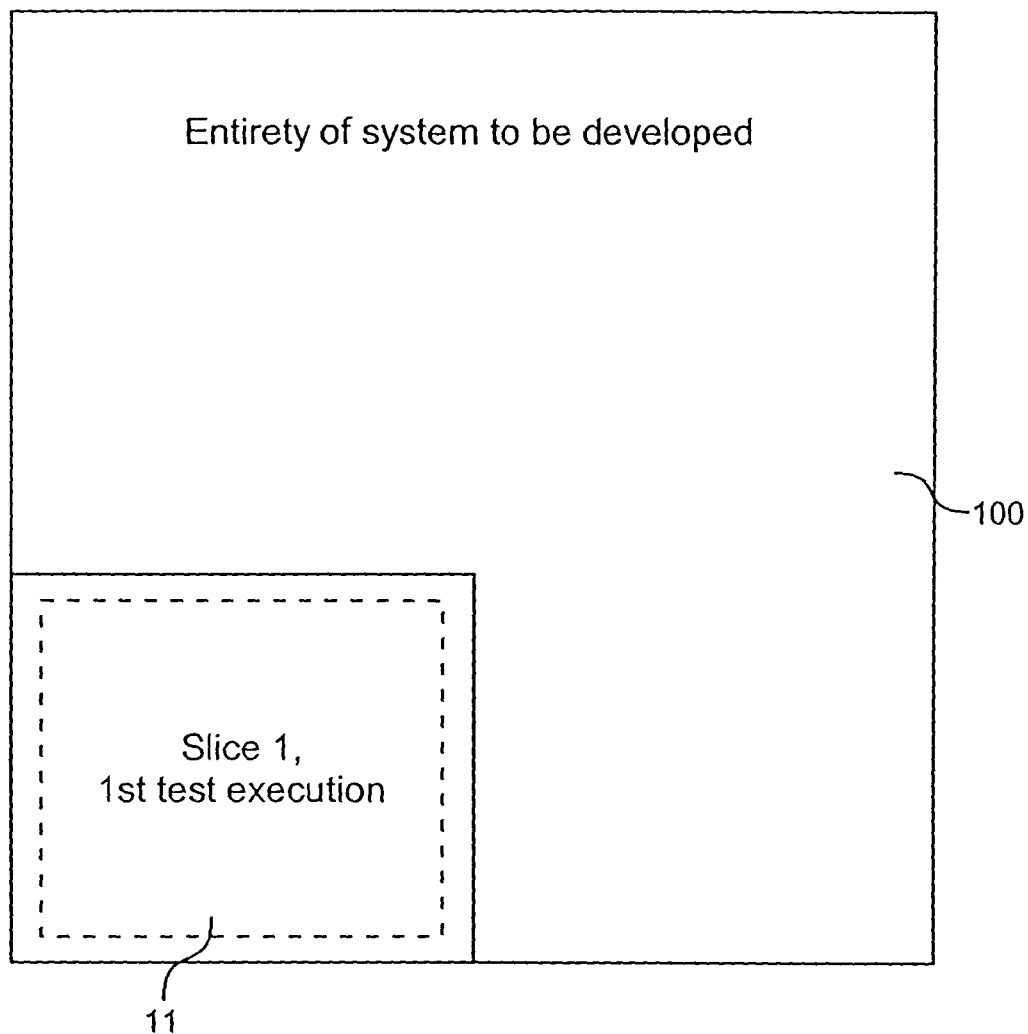
FIGS. 4-7 are schematic illustrations of successive development steps according to an embodiment of the present invention.

The first slice, indicated by reference numeral 11 in FIG. 4 at the same time forms the first development configuration which can be independently tested and undergoes a first test cycle after it is finished.

Figure 5:
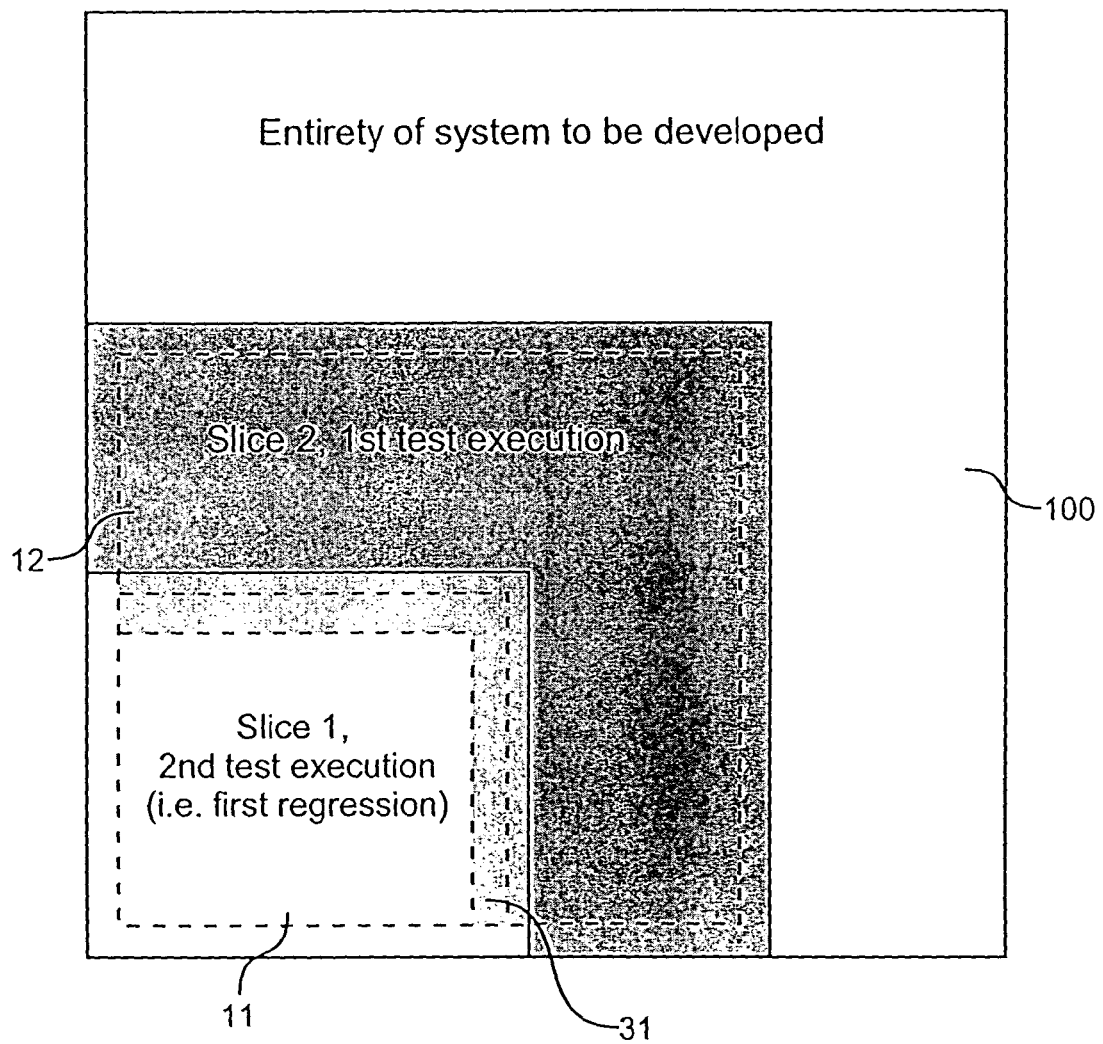

FIG. 5 shows the second development configuration including slices 1 and 2. Between the slices there is a 'thin' integration layer or integration seam 31 comprising a very limited set of components. As is illustrated schematically, the integration effort between slice 1 and 2 is relatively small compared to the overall size of the software product. After slice 2 has been completed and integrated with slice 1, the first test execution of configuration 2 (comprising slices 1 and 2) is carried out as well as the second test execution of configuration 1 (slice 1).

Figure 6:
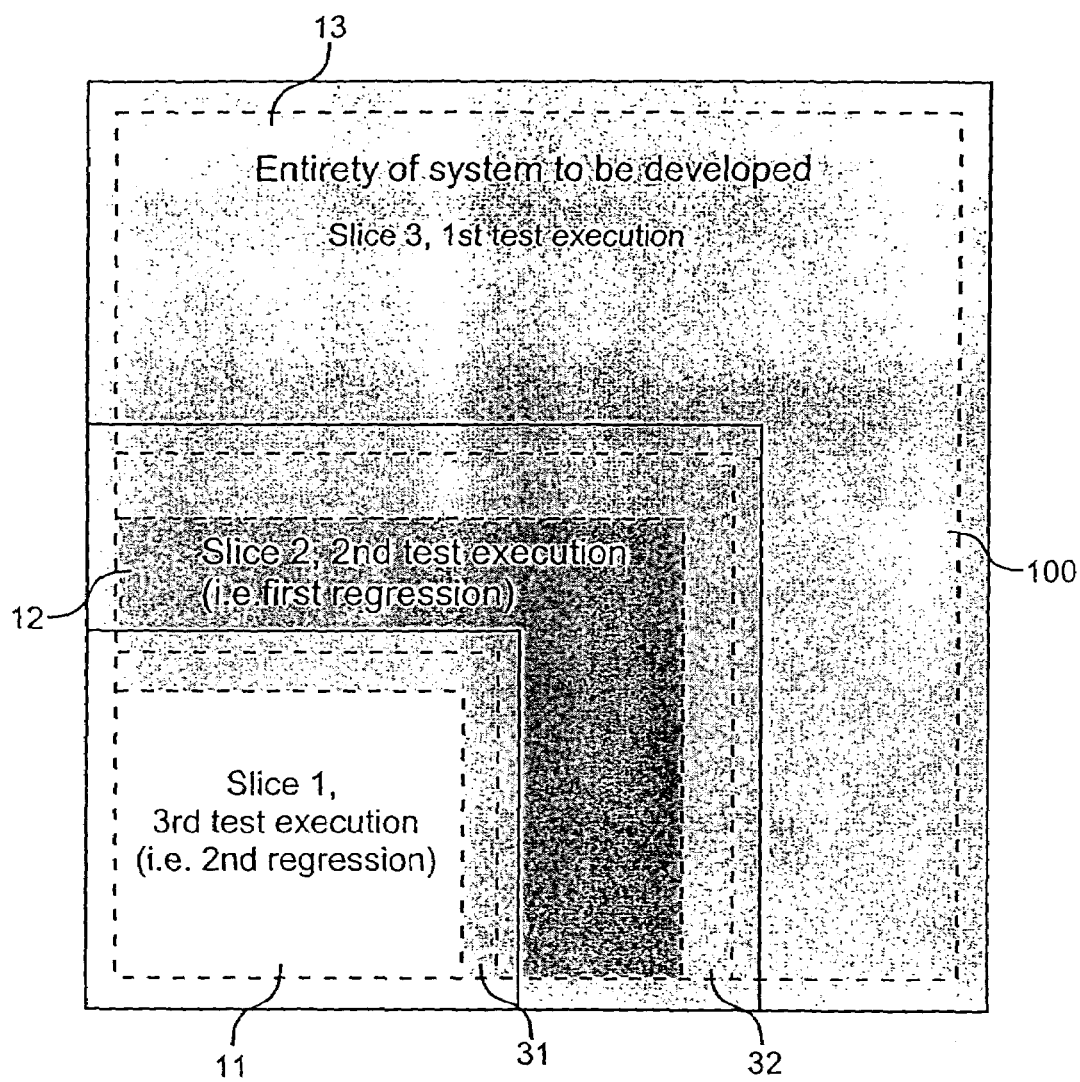

FIG. 6 shows the situation when the entire system consisting of slices 1, 2 and 3 has been created. Then the third test execution or second regression of configuration 1, the second test execution or first regression of configuration 2 and the first test execution of configuration 3 (in this example the entire system) is carried out.

In many cases, a slice touches functionality so that outputs may be captured using the system's existing output or interaction mechanisms, e.g. windows, sreens, reports or files. A slice should be designed to make use of such existing mechanisms as much as possible, or ensure that these mechanisms are delivered with the slice, specifically to avoid stubbing (which is waste work). Thus, a configuration should be tested using the system's ultimate output/interaction mechanisms. Sliced development allows the gradual build up of a system through a number of configurations, ensuring that the complexity of overall integration is encapsulated in well understood and discrete interface seams which ease the programming effort and are transparent in testing.

Figure 7:
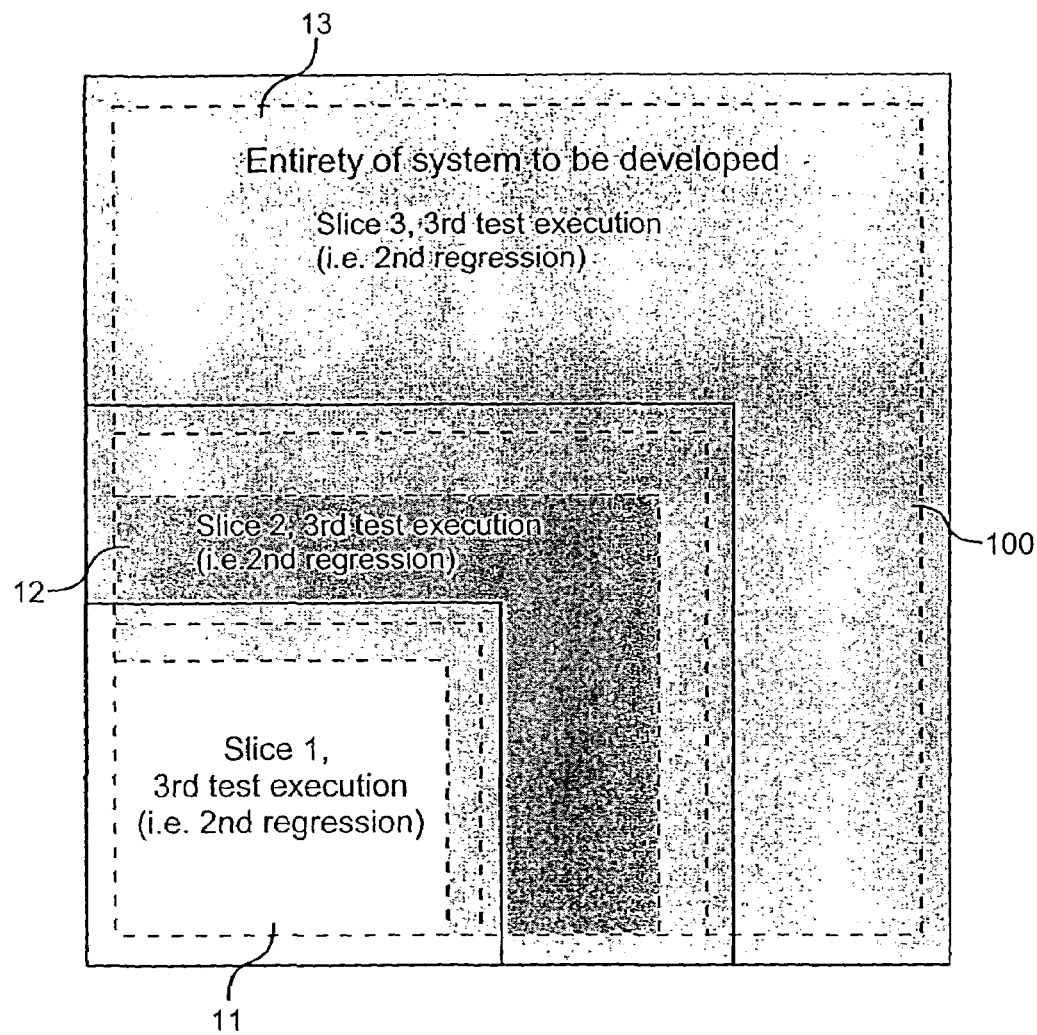
Figure 8:
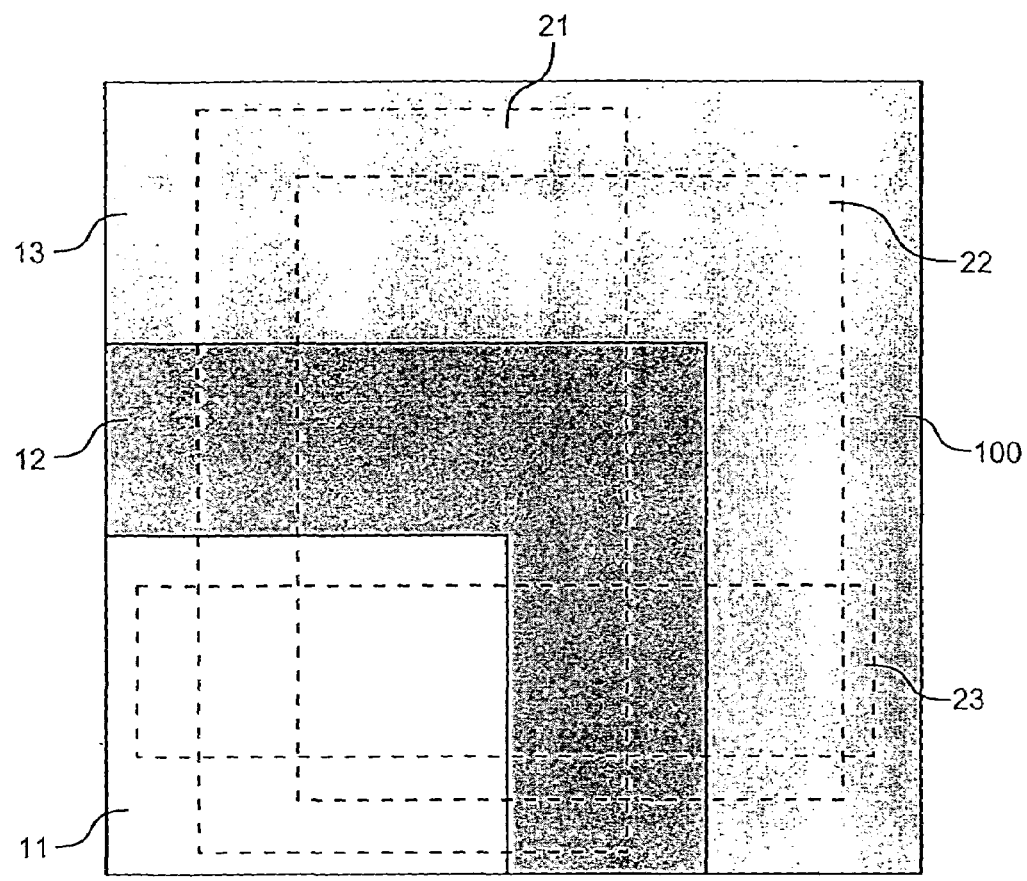
FIG. 8 is a schematic illustration for explaining regression testing.

FIG. 7 illustrates the development process after three test cycles have been executed for all three configurations, i.e. one primary or initial test plus two regression tests. The regression test is further illustrated in FIG. 8. Subject to the regression test is also the entire software product equivalent to development configuration 3. As is illustrated by dotted squares 21, 22 and 23, the tested sets of functionality are different from those defined by the respective slices. So a comprehensive testing of the overall system is carried out ensuring proper functioning of the complete software product.

Figure 9:
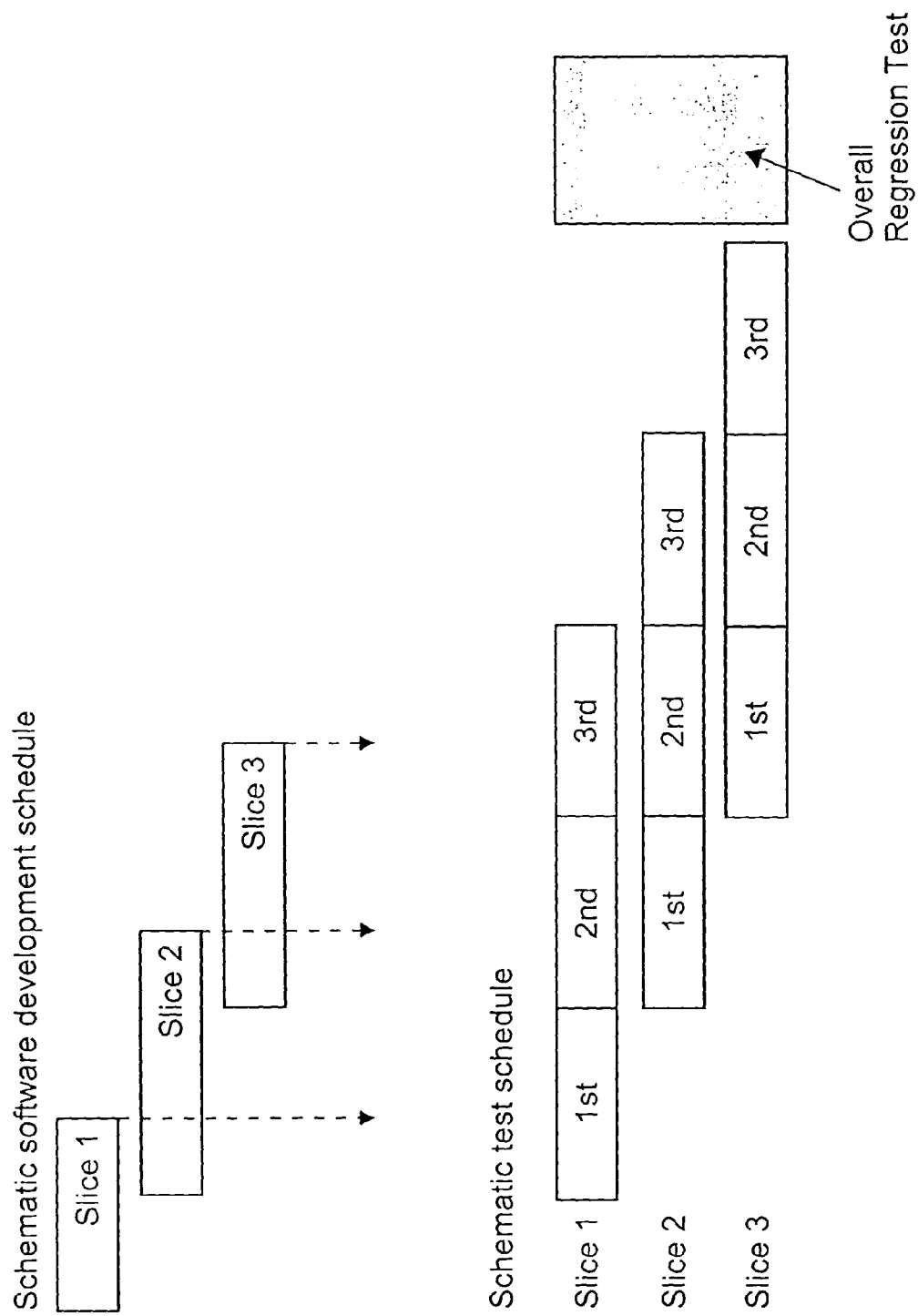
FIG. 9 is a time chart schematically illustrating a software development and test schedule according to an embodiment of the present invention.

A time schedule of software development (design and build phases) and testing activities of a particular embodiment of the present invention is shown in FIG. 9. After production of slice 1 has been finished, the first test execution of slice 1 starts in parallel with building slice 2 and slice 3. After slice 2 is finished, the first test execution of the second slice and the second test execution of the first slice is carried out while at the same time slice 3 is built. By this overlapping activities, time savings can be realized. Moreover, the testing immediately after integration of new functionalities ensures that bugs are identified as early as possible. Repeated test execution of earlier implemented functions ensures that these are not lost during the ongoing development process.

The test content (in terms of test conditions and scenarios) for each of the three test executions is identical. What differs is the target success rate. A typical target scenario is: $1^{st}$ execution approaches 70% of all conditions successful, $2^{nd}$ execution approaches 90% successful, $3^{rd}$ execution approaches 100% successful. In that respect, the $2^{nd}$ and $3^{rd}$ executions are already regressions of the $1^{st}$ execution, allowing for gradual shakedown of the configuration as potential errors are fixed and corrections are migrated to product test.

The division into $1^{st}$, $2^{nd}$ and $3^{rd}$ executions allows the construction team bundle error fixes in so-called "Fix Configurations", and deliver such fix configurations to a given schedule (i.e. between nth and n+1th test executions). Such bundling of error corrections increases the overall stability of the software (as typically a manageable number of errors are fixed and then tested together). This approach is superior to correcting errors piecemeal and migrating the corrections on a continous basis (this negatively impacts the testing team), or fixing all errors together, at the end of testing, which increases the complexity of overall integration and may still not address potential "masked errors". The migration of error fixes to product test between execution allows the test team to re-try failed testing and discover potential dependent problems ("masked errors") early, in any case within the given execution schedule. This is also the reason why the planned success rate is graduated 70-90-100 between the three executions of a slice.

Figure 10:
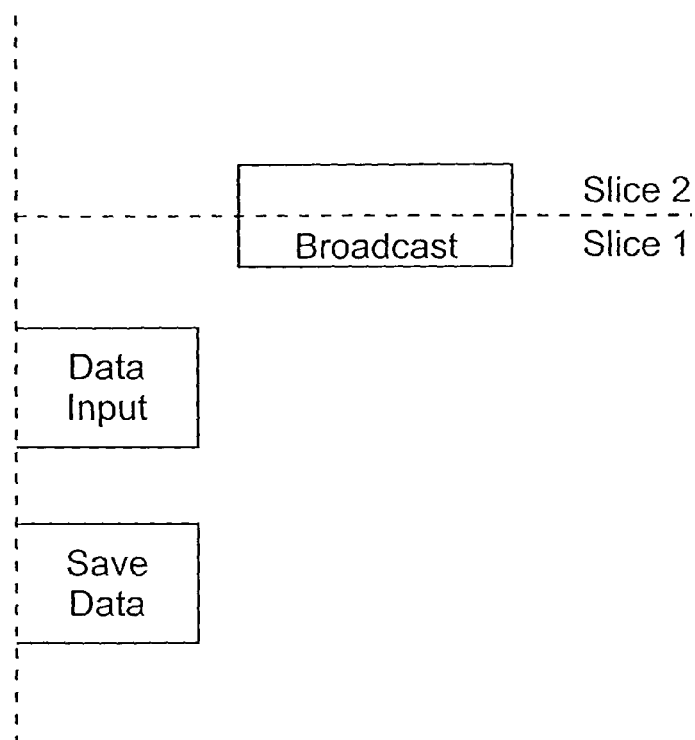
FIG. 10 is an illustration schematically showing an interface between two slices.

FIG. 10 schematically shows an integration layer between two different slices. Whereas data input and safe functions can be tested with the first configuration since no functionality of subsequent slices is required, the broadcast function in response to a data entry to other system components, in this example, requires functionality of slice 2. For testing configuration 1, dummy parameters are inserted at the broadcast interface for executing the tests of configuration 1. With development of slice 2, these stub parameters are replaced by the actual used variables.

The integration seam comprises of a limited set of components delivered with configuration k as part of slice k, which may be adapted again with slice k+1. Also, the integration seam may also comprise components which were "stubbed" with configuration n as part of slice k, and which are replaced with real functionality-bearing components as part of slice k+1.

The goal of the slicing approach is not to define small units of work as in the case of program modules, but rather to structure the work units so that integration effort is minimized. The integration complexity is concentrated on isolated boundary areas between the program slices. The complexity of integration and corresponding testing can therefore be greatly reduced. This is also a main advantage with respect to the iterative development approach. In contrast to the iterative development, the overall functionality and architecture of the finished product is devised at the beginning of the development process. Integration boundaries are confined to the isolated integration seams between the different slices. Problems associated with integration and corresponding tests can therefore be moved from the test phase where they cause a large amount of re-work to the earlier design phase. With the iterative approach, the consequences of adding new functionality to the existing software cannot be overseen. The risk of integration failures which are detected not before carrying out the tests is therefore very high.

As soon as one slice is constructed, the testing routine of this slice can be performed. It is thus possible to perform in an early stage of the overall product implementation process a test including end-to-end functionality. This has the advantage that major design faults can be detected early. The end-to-end principle also makes concrete to the developers what is being developed. By working on a slice, a software developer gets a better feeling for the principles and functions of the whole product he works on as if he/she would work on a module having a more singular and autonomous function. The training of the product developers can so be improved enhancing product quality and reducing development time. For these purposes it is also possible to start with designing, constructing and testing an easy and/or exemplary slice to train software developers for the project.

Figure 11:
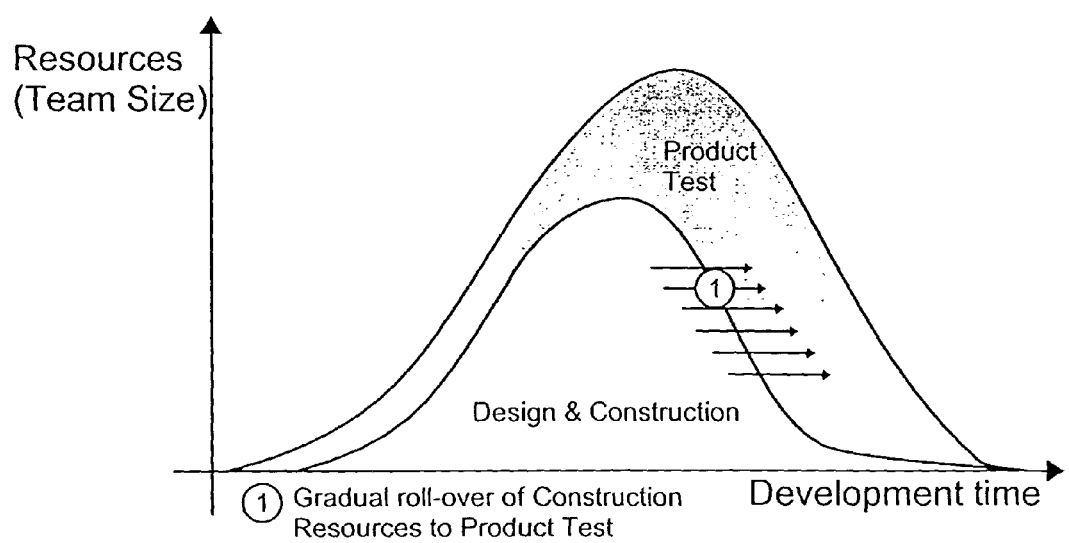
FIG. 11 is an illustration showing the resource utilization over time according to an embodiment of the present invention.

The present invention further allows high utilization of development resources. Skill and know-how which was built up during the design and build phases of a slice can be reused for designing and executing the test routines reducing the time required for testing. The approach of the present invention allows for a continuous rollover of design/build resources into testing activities as can be deduced from the timing schedule of FIG. 9. The resource utilization over development time approximately follows a Bell curve as is illustrated in FIG. 11. The development team can so remain relatively slim during the entire duration of the product reducing development costs.

The sliced development approach generally allows highly efficient resource utilization with gradual ramp-up and ramp-down. Also, high efficiency is achieved by allowing a gradual re-use/roll-over of design and programming resources into the testing team, bringing valuable background of the new or adapted system functionality to the testing team.

Figure 2:
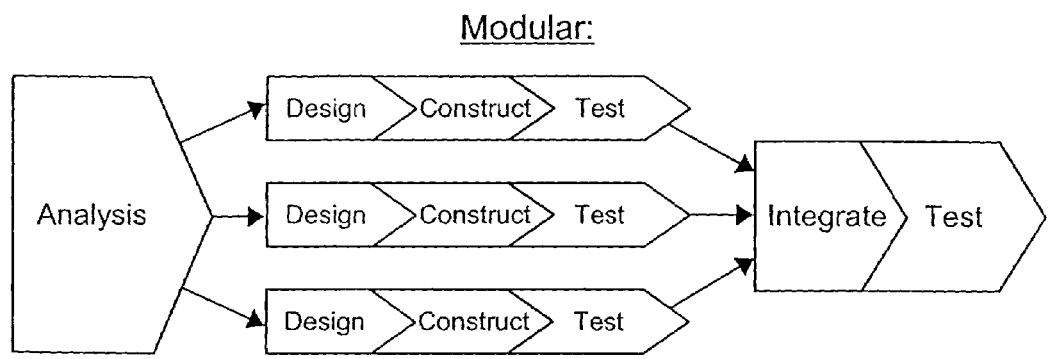
FIG. 2 is a schematic illustration of the method steps for producing a software product according to the prior art modular approach.
Figure 3:
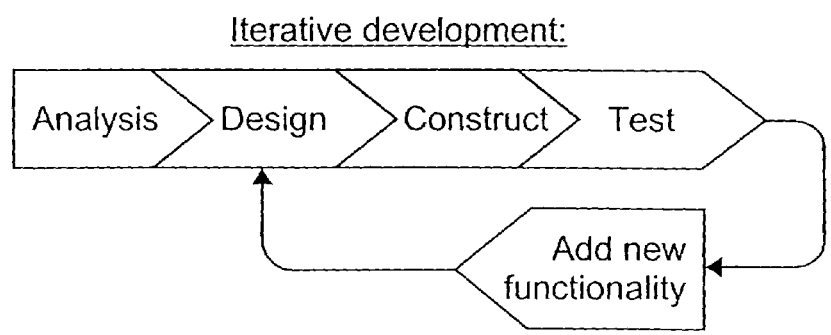
FIG. 3 is a schematic illustration of the method steps for producing a software product according to the prior art iterative (recursive) approach.

As has been discussed in the introductory portion to the description with the waterfall approach, the software product is completely analyzed, then completely designed, then completely programmed and finally completely tested. With the waterfall approach (FIG. 1) and with the modular approach (FIG. 2) integration issues typically appear at once, which makes their resolution much more difficult as these issues often inter-depend. Also, the elapsed time to develop is longer as each work unit depends on (and has to wait for) the work unit which takes longest to complete (the "weakest link problem").

Figure 12:
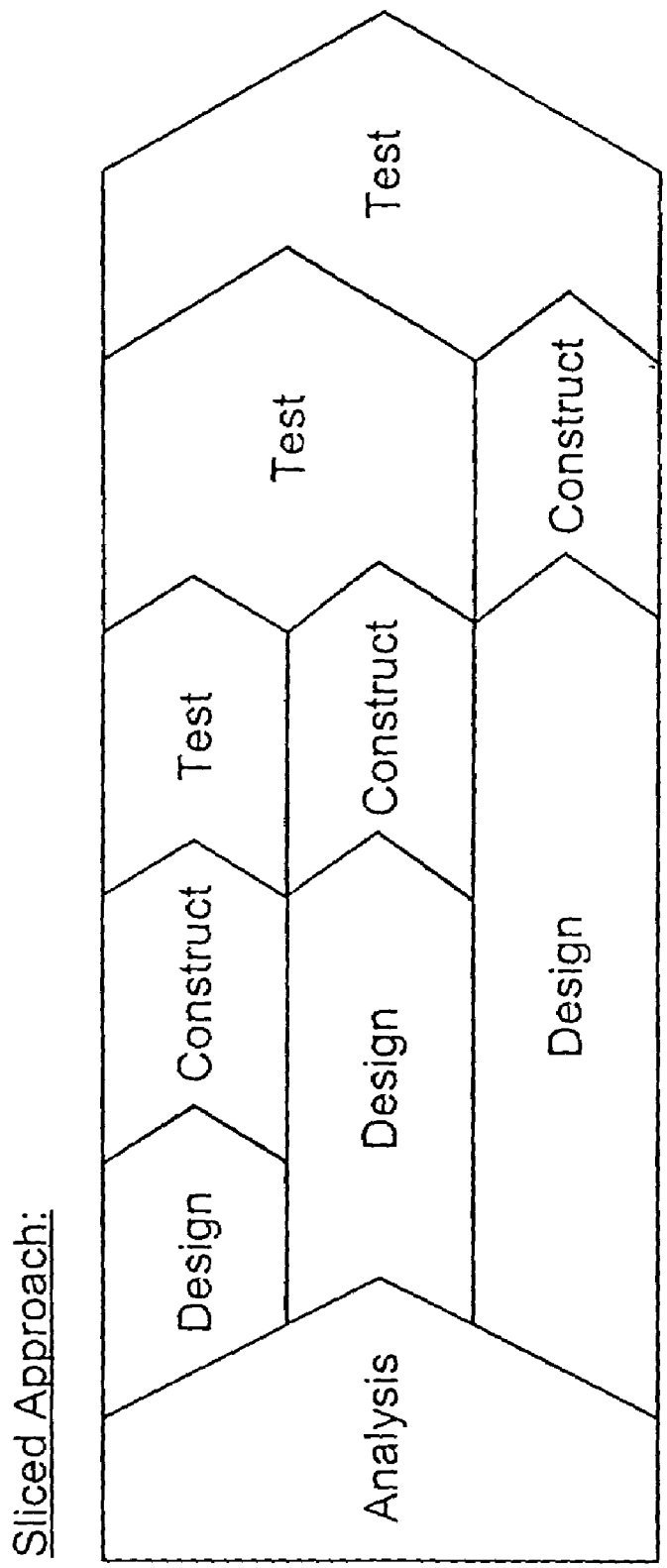
FIG. 12 is schematic illustration of the method steps for producing a software product according to an embodiment of the present invention.

The sliced approach illustrated in FIG. 12 eradicates this weakest link problem. The development is tailored to focus on quick delivery of base functionality (lower processing layers) first. Such a first delivery is complete in terms of supporting end-to-end functionality, which means that there are defined entry points to trigger the functionality to be tested and defined output points to capture the test results for verification. Implementation time savings come from the ability to drive a piece or slice of the application through the entire development cycle quickly so that following slices can benefit from the development process enhancement and optimizations identified during earlier phases through the development approach. There is also a learning curve benefit associated with having people familiar with all development stages and therefore aware of the critical information needed by programming that has to be identified in design. This experience reduces the degree of re-work needed in the waterfall approach.

Slices are typically defined such that they are approximately of equivalent size in terms of development effort or workload. This allows standardized management, status reporting and tracking procedures.

The test cycles themselves may be grouped together into functional test groups. In order to facilitate the testing procedures, different groups preferably have approximately the same size. For repeated execution of test cycles, preferably test data bases are provided.

According to the present invention the overall system is, in parts, integrated as early as possible. Then, the number of integrated components is gradually increased in a controlled, but manageable fashion. The software product can be tested as an integrated system at all times, starting with an integrated sub-set of the system, but quickly approaching the overall integrated system. This can be achieved with a highly use/re-use of resources within a minimum of elapsed time.

The method of the present invention may be applied to any type of software system to be developed. The advantages of the present invention, however, are particularly significant in the case of large, complex software products as they provide the opportunity to perform large amounts of work in parallel.

Figure 13:
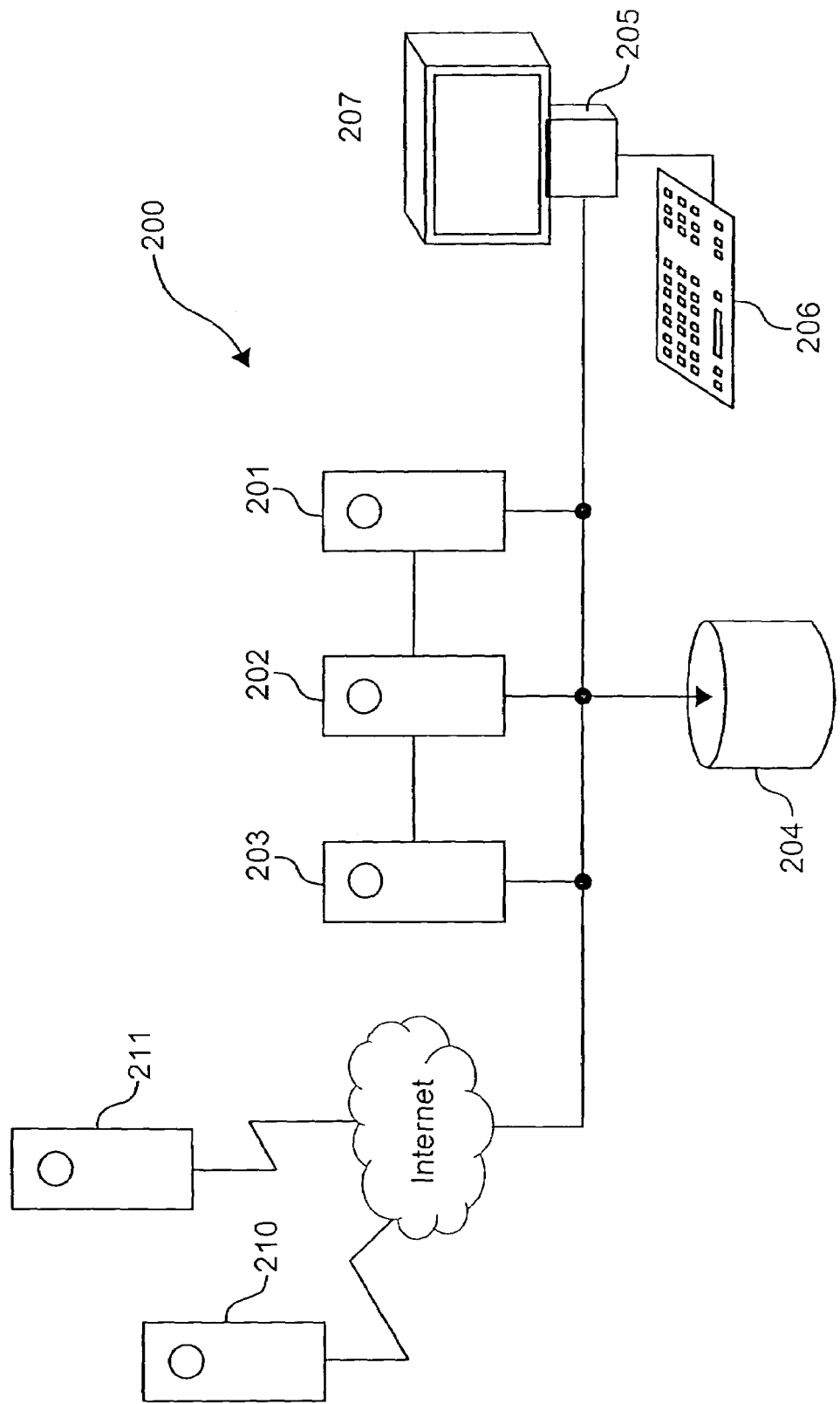
FIG. 13 is a schematic illustration of a hardware configuration to which the present invention is applicable.

A software product program developed in accordance with the present invention can run on every type of computer system, like a personal computer, a workstation, a main frame computer or a network of interconnected computers at close or remote positions. A computer system including a plurality of servers for handling large and complex programs requiring a high degree of reliability like an online auction site is illustrated in FIG. 13. A computer system comprises three interconnected server computers 201, 202 and 203, which may be accessed over the internet by client computers 210, 211. For storing large amounts of data a storage device 204 is provided. For system administration as well as implementation an additional computer device 205 is provided having standard input/output devices like a keyboard 206 and display 207.

The invention claimed is:

1. A method of producing a software product, performed at least partially by a computer, the method comprising:
 a) defining a functional model of the software product,
 b) designing, based on the functional model, a plurality n of configurations and slices of the software product, a configuration being an entirety or a part of the software product forming an independently testable unit and a slice being a set of functions of the software product constructed together and forming an entirety or a part of a configuration,
 c) constructing, for the first time, a first slice forming a first configuration,
 d) independently constructing, also for the first time, second to n-th slices of the software product,
 e) forming a (k+1)-th configuration by integrating a k-th configuration with a (k+1)-th slice to add functionality of a (k+1)-th set of functions, wherein k=1, . . . n−1,
 f) independently testing the first to n-th configuration, where testing of the k-th configuration is performed concurrently with the construction of the (k+1)-th slice of the software product and the forming of the (k+1)-th configuration and testing of the (k+1)-th configuration includes re-testing the entirety of the k-th slice, and
 g) storing the results of the independent testing of the first to n-th configurations.

2. The method of claim 1, wherein method step a) includes defining an overall architecture of the software product.

3. The method of claim 1, wherein method step a) includes a definition of external interfaces of the software product.

4. The method of claim 1, wherein different slices are constructed at least partially parallel to each other.

5. The method of claim 1, wherein testing of a finished configuration is carried out in parallel with producing additional slices.

6. The method of claim 1 further comprising a step h) of regression testing the completed software product.

7. The method of claim 6, wherein regression testing includes a routine of subtests covering sets of functionalities different from the slices.

8. The method of claim 1, wherein an integration layer is produced comprising a limited set of components produced with the k-th configuration as part of the k-th slice and being adapted with the (k+1)-th slice.

9. The method of claim 8, wherein the integration layer comprises components which are stubbed with the k-th configuration as part of the k-th slice and which are replaced with components including real functionality as part of the (k+1)-th slice.

10. The method of claim 1, wherein at least three test executions are carried out for each configuration.

11. The method of claim 10, wherein the content of the three test executions is identical and a target success rate of the first test execution is about 70%, the second test execution is about 90% and the third test execution approaches 100% of tested functionality.

12. The method of claim 1, wherein each slice has defined entry points to trigger a desired functionality and defined outputs for verification of the desired functionality.

13. The method of claim 1, wherein the first slice includes infra-structure and/or architecture functions of the software product, the second slice includes set up functions, the third, fourth and subsequent slices include respectively, capture and/or entry functions, transaction processing functions, primary output functions and secondary output functions.

14. The method of claim 1, wherein the first slice consists of basic functionality and therefore can be completed within a short time frame.

15. The method of claim 1, wherein the slices are designed to minimize internal interfaces between different slices in order to reduce a requirement for integration testing.

16. The method of claim 15, wherein a slice has internal interfaces for not more than two adjacent slices.

17. The method of claim 1 further comprising creating, for every test routine, a test database for storing test data.

18. A computer program product stored on a storage medium produced by a process, performed at least partially by a computer, the process comprising:
 a) defining a functional model of the software product,
 b) designing, based on the functional model, a plurality n of configurations and slices of the software product, a configuration being an entirety or a part of the software product forming an independently testable unit and a slice being a set of functions of the software product constructed together and forming an entirety or a part of a configuration,
 c) constructing, for the first time, a first slice forming a first configuration,
 d) independently constructing, for the first time, second to n-th slices of the software product,
 e) forming a (k+1)-th configuration by integrating a k-th configuration with a (k+1)-th slice to add functionality of a (k+1)-th set of functions, wherein k=1, . . . n−1,
 f) independently testing the first to n-th configuration, where testing of the k-th configuration is performed concurrently with the construction of the (k+1)-th slice of the software product and the forming of the (k+1)-th configuration and testing of the (k+1)-th configuration includes re-testing the entirety of the k-th slice, and
 g) storing the results of the independent testing of the first to n-th configurations.

19. A storage medium having stored thereon a computer program product produced by the steps, performed at least partially by a computer, of:
 a) defining a functional model of a target software product,
 b) designing, based on the functional model, a plurality n of configurations and slices of the target software product, a configuration being an entirety or a part of the target software product forming an independently testable unit and a slice being a set of functions of the target software product constructed together and forming an entirety or a part of a configuration,
 c) constructing, for the first time, a first slice forming a first configuration,
 d) independently constructing, for the first time, second to n-th slices of the target software product,
 e) forming a (k+1)-th configuration by integrating a k-th configuration with a (k+1)-th slice to add functionality of a (k+1)-th set of functions, wherein k=1, . . . n−1,
 f) independently testing the first to n-th configuration, k-th configuration is performed concurrently with the construction of the (k+1)-th slice of the software product and the forming of the (k+1)-th configuration and testing of the (k+1)-th configuration includes re-testing the entirety of the k-th slice, and
 g) storing the results of the independent testing of the first to n-th configurations.

20. A computer system comprising an input/output device, a processing device and a storage device having stored thereon a computer program product produced by a process, performed at least partially by a computer, the process comprising:
 a) defining a functional model of the software product,
 b) designing, based on the functional model, a plurality n of configurations and slices of the software product, a configuration being an entirety or a part of the software product forming an independently testable unit and a slice being a set of functions of the software product constructed together and forming an entirety or a part of a configuration,
 c) constructing, for the first time, a first slice forming a first configuration,
 d) independently constructing, for the first time, second to n-th slices of the software product,
 e) forming a (k+1)-th configuration by integrating a k-th configuration with a (k+1)-th slice to add functionality of a (k+1)-th set of functions, wherein k=1, . . . n−1,
 f) independently testing the first to n-th configuration, where testing of the k-th configuration is performed concurrently with the construction of the (k+1)-th slice of the software product and the forming of the (k+1)-th configuration and testing of the (k+1)-th configuration includes re-testing the entirety of the k-th slice, and
 g) storing the results of the independent testing of the first to n-th configurations.

* * * * *